United States Patent [19]
Rosaen

[11] Patent Number: 4,619,139
[45] Date of Patent: Oct. 28, 1986

[54] FLOW METER WITH DISPLACEABLE FLOW RATE INDICATOR

[75] Inventor: Lars O. Rosaen, Hazel Park, Mich.

[73] Assignee: Universal Flow Monitors, Inc., Hazel Park, Mich.

[21] Appl. No.: 688,907

[22] Filed: Jan. 4, 1985

Related U.S. Application Data

[63] Continuation-in-part of Ser. No. 633,649, Jul. 23, 1984.

[51] Int. Cl.$^4$ .................................................. G01F 1/22
[52] U.S. Cl. ..................................... 73/198; 73/861.55
[58] Field of Search ........... 73/861.53, 861.54, 861.55, 73/861.57, 861.58, 198; 374/40, 41

[56] References Cited

U.S. PATENT DOCUMENTS

| | | | |
|---|---|---|---|
| 2,755,664 | 7/1956 | Chapman | 73/861.57 |
| 3,528,288 | 9/1970 | Scourtes | 73/861.53 |
| 3,910,112 | 10/1975 | Gerlach | 73/861.53 |
| 3,979,955 | 9/1976 | Schulte et al. | 73/861.55 |
| 4,235,105 | 11/1980 | Walter | 73/861.53 |
| 4,361,051 | 11/1982 | de Fasselle et al. | 73/861.54 |
| 4,424,716 | 1/1984 | Boehringer et al. | 73/861.56 |

*Primary Examiner*—Herbert Goldstein
*Attorney, Agent, or Firm*—Gifford, Groh, VanOphem, Sheridan, Sprinkle & Dolgorukov

[57] ABSTRACT

A flow meter includes a transparent tubular housing in which an indicator in the form of a piston having a radially expanded edge cooperates with a tapered inner peripheral wall portion of the housing. The housing can include scale indicia of flow rates coinciding with positions of the indicator edge. In addition, a temperature sensitive label providing a visible indication of fluid temperature can be orthogonally aligned with respect to the flow rate scale to permit accurate placement of a graphic overlay exhibiting representations of a different fluid characteristic which varies with changes in the flow rate and temperature of the fluid within the ranges indicated by the meter. Projection of the temperature indication to the indicator edge identifies a particular value for the fluid characteristic shown on the graphic representation by mere observation. The inner periphery of the housing includes a radially expanded portion at one end to provide a bypass for fluid at flow rates greater than the normal range for the meter.

17 Claims, 8 Drawing Figures

FLOW METER WITH DISPLACEABLE FLOW RATE INDICATOR

REFERENCE TO RELATED APPLICATION

This application is a continuation-in-part of Applicant's copending U.S. Ser. No. 633,649, filed July 23, 1984.

BACKGROUND OF THE INVENTION

I. Field of the Present Invention

The present invention relates generally to meters for measuring the flow rate of fluid in a fluid system, and more particularly to such a meter having perceptible indicators for displaying an indication of fluid characteristics related to the temperature and flow rate of the fluid.

II. Description of the Prior Art

There are many types of previously known flow meters which provide a visual indication of the flow rate of a fluid in a fluid system. For example, in a moving vane type flow meter, a vane is displaced and oriented in a predetermined position corresponding to the flow rate of the fluid passing through the meter. The vane may be linked to an arm extending across the face of a scale so that the position of the arm on the scale provides a visible indication of the flow rate of the fluid. Quite often, the indicator is positioned outwardly of the flow meter so that the indicator is visible from the exterior of the flow meter housing. As a result, the linkage between the vane acted upon by the fluid and the indicator can add a substantial amount of weight and inertia to the vane mechanism, thus reducing the efficiency and accuracy of the reading provided by the indicator.

Of course, other indicator means may also be external to the flow meter such as a digital display device. However, such devices are substantially more complex and often more expensive than simple mechanical linkages and indicators. In any event, previously known flow meters are of limited use in that they convey no information as to other characteristics of the fluid such as temperature, or characteristics of a fluid which may change in response to changes in temperature or flow rate.

In addition, although there are known means for measuring the temperature of a fluid, previously known thermometers are not well adapted for use with flow meters. As a result, the empirical data which is provided by the previously known flow rate meters and temperature indicators must be analyzed and calculated according to standard material property relationships in order to obtain information about other characteristics of the fluid in the system. For example, in order to establish the net heat flow rate between two points in a fluid system, substantial calculations must be performed utilizing the data from the previously known flow meters and temperature indicators. Similarly, when the viscosity of the fluid is affected by changes in temperature of the fluid, it may be necessary to perform complex calculations to determine the viscosity of the fluid under existing fluid system conditions. While such calculations can be handled by trained engineers, such a process can be time consuming and may not be easily handled by untrained mechanics.

Although it may also be possible to utilize a computer in processing the information, such a system is extremely complex and prohibitively expensive, especially for small fluid systems. In any event, the previously known flow rate meters do not provide a visual indication of the tempertaure and flow rate in a manner which readily displays other desired fluid flow characteristics, or in a manner which would be readily understood by unskilled technicians and others without substantial data processing.

SUMMARY OF THE PRESENT INVENTION

The present invention overcomes the above mentioned disadvantages by providing a flow meter which provides an indication of the flow rate by permitting direct observation of a displaceable member acted upon by the flow of fluid. Generally, the flow meter comprises a transparent housing portion adjacent a fluid passage in which a displaceable indicator is acted upon by the flow stream through the meter. The indicator includes a straignt line indicia, preferably a radial edge on the indicator, to provide a visible indication of the flow rate of fluid passing through the meter.

In the preferred embodiment of the present invention, the flow meter housing is a tubular transparent housing portion in which a displaceable flow rate indicator in the form of a piston is spring biased toward one end of the housing. The indicator is linearly displaceable along the tubular housing portion so that a linear scale of flow rates can be exhibited by the flow meter. This can be accomplished by tapering the inner peripheral wall at a predetermined inclination from one end to the other, the degree of inclination depending upon the range of flow rates to be indicated by the meter. Moreover, the end of the tubular housing toward which the piston is urged by the fluid includes an enlarged bore portion to form a bypass for fluid when the flow rate of fluid exceeds a predetermined value.

Also in the preferred embodiment, a temperature sensitive label scaled to define a range of temperatures for the operating fluid is aligned orthogonal to the flow rate scale. In addition, a chart means having a graphic representation of a fluid characteristic relating to flow rate and temperature can be superimposed upon or aligned with the flow rate and temperature scales so that a relevant value for an additional fluid characteristic is exhibited by the meter without further analysis of fluid flow characteristics.

An advantageous use of a flow meter constructed in accordance with the present invention includes the use of two flow meters secured in the fluid system at predetermined points to determine the heat flow rate, and thus the relative gain or loss of heat between those points of the system. In such a case, the graphic representation on the chart means includes indicia corresponding to the heat flow rate at a particular fluid flow rate and temperature of the fluid. By comparing the indications provided by each of the meters, the difference in heat flow rates between the two points of the system is relatively easy to understand from observation of the chart means on each indicator. An alternative advantageous use of a flow meter in accordance with the present invention permits the viscosity of the fluid to be determined from observation of the chart means.

Thus, the present invention provides a flow meter wherein a visible indicator is directly acted upon by the fluid flowing through the meter. Thus, the present invention minimizes the complexity and bulk of the flow meter structure and provides a highly efficient indication of flow rate. In addition, the present invention provides a means for utilizing sensed characteristics of the fluid to exhibit the condition of the third characteristic related to two sensed characteristics. In addition, the indication exhibited is readily understood by unskilled or untrained personnel, and does not require mental or computerized analysis of fluid characteristics exhibited by the flow meter. These and other advantages will be more clearly understood from the following discussion of the preferred embodiment of the present invention.

BRIEF DESCRIPTION OF THE DRAWING

The present invention will be more clearly understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
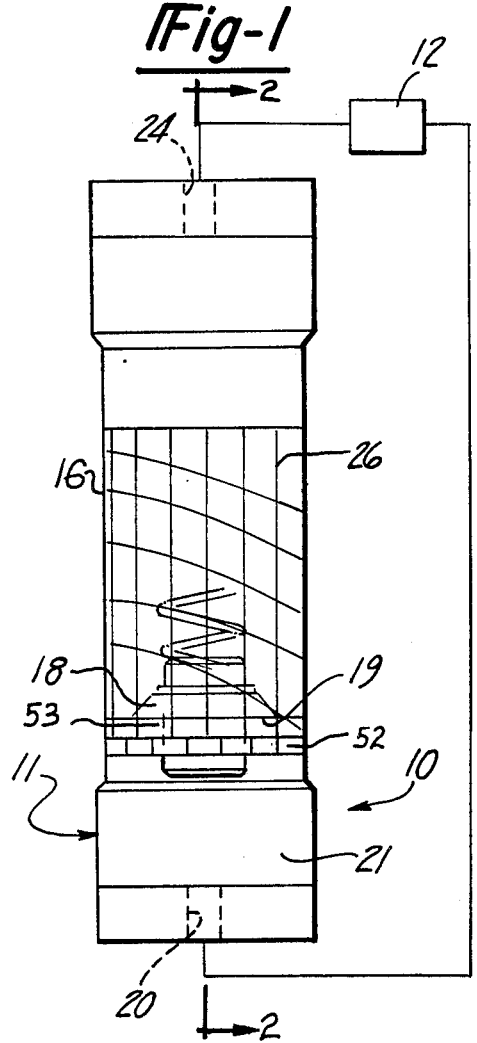
FIG. 1 is a front plan view of the flow meter constructed in accordance with the present invention.

Referring first to FIG. 1, a flow meter 10 according to the preent invention is thereshown connected in fluid communication with a fluid system 12. The flow meter housing 11 includes a tubula, transparent body portion 16 through which a displaceable indicator element 18 can be viewed. As will be described in greater detail hereinafter, as fluid from the system 12 flows into the inlet 20 of the meter 10, the indicator 18 is displaced within the body portio 16 to provide anindication of the flow rate of fluid through the meter 10. Flow meter 10 may be provided with flow rate scale indicia 26 so that the indicator edge 19 on the indicator 18 identifies a particular flow rae value at the viewing face 21 of the body portion 16. Of course, the fluid flows back into the system 12 from the meter 10 through the outlet 24.

Figure 2:
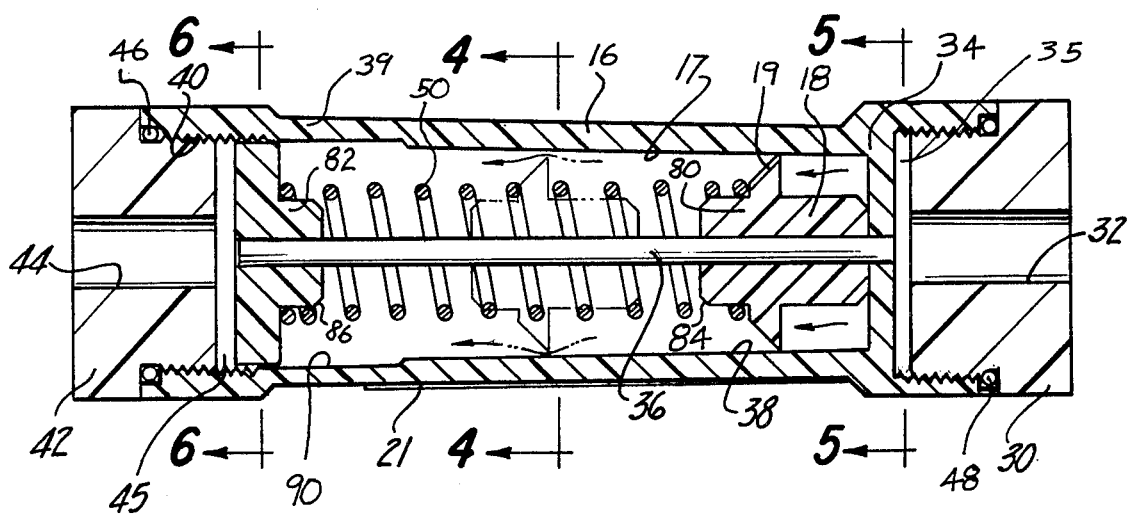
FIG. 2 is a rotated cross-sectional view taken substantially along line 2—2 in FIG. 1.
Figure 4:
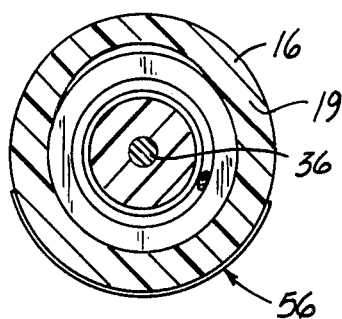
FIG. 4 is a sectional view taken substantially along the line 4—4 in FIG. 2.
Figure 5:
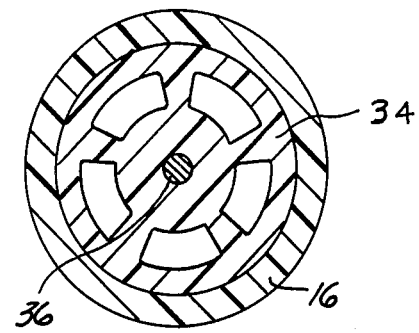
FIG. 5 is a sectional view taken substantially along line 5—5 in FIG. 2.

As best shown in FIG. 2, the inlet 20 is formed by a threaded end cap 30 which closes an open end of the housing portion 16. A fluid passageway 32 in the end cap 30 is adapted to received a fluid coupling for connecting the meter 10 in fluid communication with the system 12 in a well known manner. The tubular housing 16 includes a partition or wall 34 in the form of a radial spider wall (FIG. 5) which supports an elongated guide rod 36 extending axially through a chamber 38 formed by the tubular housing 16. The rod can be secured in the wall by embedding, welding or other fastening means. The innermost end of the cap 30 is spaced apart from wall 34 to form a chamber 35 therebetween in communication with the fluid passageway 32 and the openings in wall 34. The end cap 30 is sealed to the end of the tubular housing 16 by an "O" ring 48.

Figure 6:
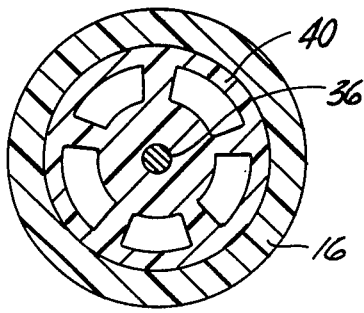
FIG. 6 is a sectional view taken substantially along the line 6—6 in FIG. 2.

The other end of guide rod 36 is secured within a support body 40 which, as best shown in FIG. 6, has a spiderlike shape. The support body 40 is retained in position adjacent an end cap 42 threadably engaging the tubular end of the housing portion 16 and having a fluid passageway 44 extending therethrough. The end cap 42 is spaced slightly from the support body 40 to form a chamber 45 intermediate passageway 44 and the openings in support body 40. The passageway 44 is adapted to receive a fluid coupling in a well known manner to form the outlet 24. End cap 42 is fluidly sealed against the housing portion 16 by an "O" ring 46.

The indicator element 18 includes a bore dimensioned to permit the element 18 to slide along guide rod 36. The indicator 18 comprises a substantially cylindrical body having a radially expanded indicator edge 19. When the end of the indicator 18 abuts against the wall 34, the indicator edge 19 abuts against the inner periphery of the tubular housing 16 and defines a zero-point for the flow rate scale. At least a portion of the inner peripheral wall of the housing portion 16, such as portion 17 opposite viewing face 21, tapers radially outwardly from the wall 34 towards the support body 40 so that displacement of the indicator element 18 along the guide rod 36 causes at least a portion of the indicator edge 19 to become spaced apart from the inner periphery of the tubular housing 16 and permit passage of fluid toward to outlet 24. Nevertheless, in the preferred embodiment, a portion of the indicator edge 19 abuts against the viewing face portion 21 of the housing and remains visible through the transparent housing 16. In addition, the peripheral wall at the end 39 of chamber 38 includes an enlarged radial recess 90. Once the indicator 18 is urged into end 39 of chamber 38, when the flow rate exceeds the normal range of the meter, fluid can freely pass beyond the indicator 18 and flow toward support body 40.

A spring 50 extends between support body 40 and the indicator 18, thus, normally retaining the indicator 18 in position against the end wall 34. The coil spring 50 fits over a stub 80 of indicator 18 and a stub end 82 on support body 40. The outermost portions of the stub ends 80 and 82 are tapered as shown at 84 and 86, respectively, so that loops of the coil spring 50 can freely slide over the body of the stub ends 80 and 82 without interference during compression of the spring 50.

It is to be understood that fluid introduced into the inlet 20 passes through passageway 32 in the end cap 30, through chamber 35, through the apertures defined in the wall 34 and against the indicator element 18 within the chamber 38. The indicator element 18 is thereby forced toward the outler 24 (to the left as shown in FIG. 2) against the force of the spring 50. The taper of the inner periphery of the wall forming the tubular housing 16 is determined in accordance with the flow rate range to be indicated on the face of the meter 10 so that displacement of the indicator 18 corresponds to predetermined flow rates indicated on the flow rate indicia 26. Moreover, the zero-point of the flow rate indicia 26 is aligned with the position of indicator edge 19 when the indicator 18 is at rest against wall 34.

Referring again to FIG. 1, the flow meter 10 according to the present invention is well adapted for use with a temperture sensitive label or strip 52 positoned below the zero-point indicated by the initial position of the indicator edge 19. Heat contained in the fluid passing through the system 12 is conducted to the strip 52 which is adhesively secured to the exterior of the transparent housing portion 16. Although the temperture sensitive strip 52 can be constructed in any known manner, it is preferable that the strip 52 include scaled gradations and numerical indicia to designate particular temperature ranges within which the strip 52 is effective. In any event, the strip 52 preferably includes a heat sensitive material which changes color as the temperature reaches a predetermined level, and the color changes gradually along the length of the strip 52 as the temperature increases to provide a discrete indication of temperature. In the preferred embodiment, the strip 52 includes discrete crystal segments, each of which changes color at a predetermined, progressively higher temperature along the length of the strip 52.

Figure 3:
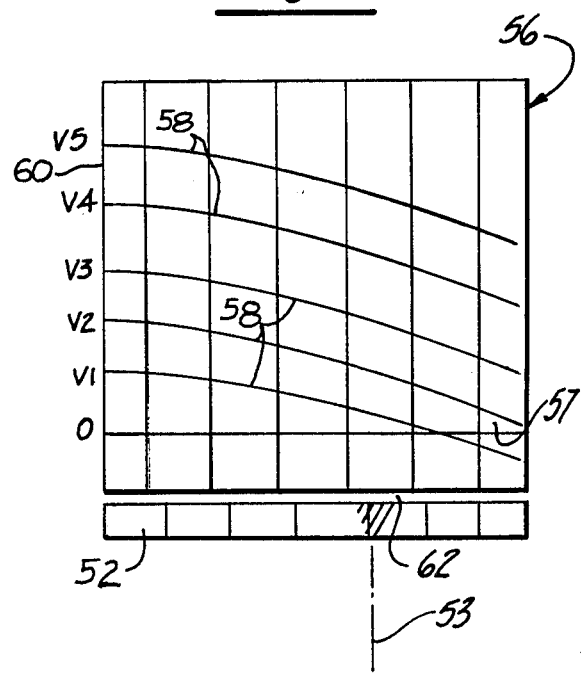
FIG. 3 is a front view of a portion of the apparatus shown in FIG. 1.

As also shown in FIGS. 1 and 3, a chart means 56 for presentation of an additional fluid characteristic can be applied over the transparent body 16. The chart means 56 comprises a substantially transparent panel 57 having a graphic representation of a particular fluid characteristic, and is secured to the transparent housing portion 16 above the temperature sensitive strip 52. The chart means 56 includes an orthoganal, ordinate axis 60 corresponding to the flow rate indicia 26 and an abscissa axis 62 corresponding to the termpeature indicia displayed on the temperature sensitve strip 52. The alignment of the axes with the zero point of indicia 26 and corresponding temperature indicia on strip 52 enables the color line (shown in phantom line at 53 in FIG. 3) exhibited by the strip 52 to be projected upwardly to intersect with the indicator edge 19 of the indicator 18, whereby a particular value of the characteristic indicated on the chart means 56 is visually emphasized.

Still referring to FIG. 3, a particular chart means 56 is thereshown including graphic representations of the viscosity of a fluid at particular flow rates and temperatures in the form of curves 58. The graph displays five discrete values of viscosity and the manner in which such viscosity values are affected by temperature, as well as the flow rate which will occur at a predetermined viscosity and temperature. Thus, it will be understood that as the indicator edge 19 reflects the flow rate of the fluid flowing through the meter 10, and the colored portion of the strip 52 illustrates temperature (as shown by the shading lines in FIG. 3), the projected intersection of these indications identifies a particular point on the curves 58 so as to provide a readily perceptable indication of the viscosity of the fluid flow through the system. Of course, it will be understood that the range of values along the ordinate axis 60 and the range of values indicated along the abscissa axis 62 are selected to correspond and register with the flow rate values defined on the indicia 26 and temperature scale defined on the label 52, respectively, so as to provide a direct correlation between the flow rate, temperature and viscosity or other characteristic value displayed on the chart means 56. Moreover, it will be understood that curves 58 can be representative of other parameters specifically related to the particular fluid flowing through the system 12.

Figure 7:
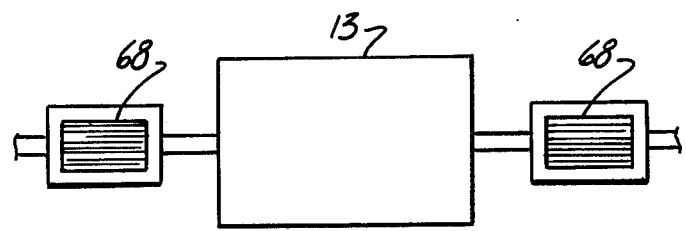
FIG. 7 is a diagrammatic view of a fluid system employing a pair of flow meters constructed in accordance with the present invention and showing a modification thereof.
Figure 8:
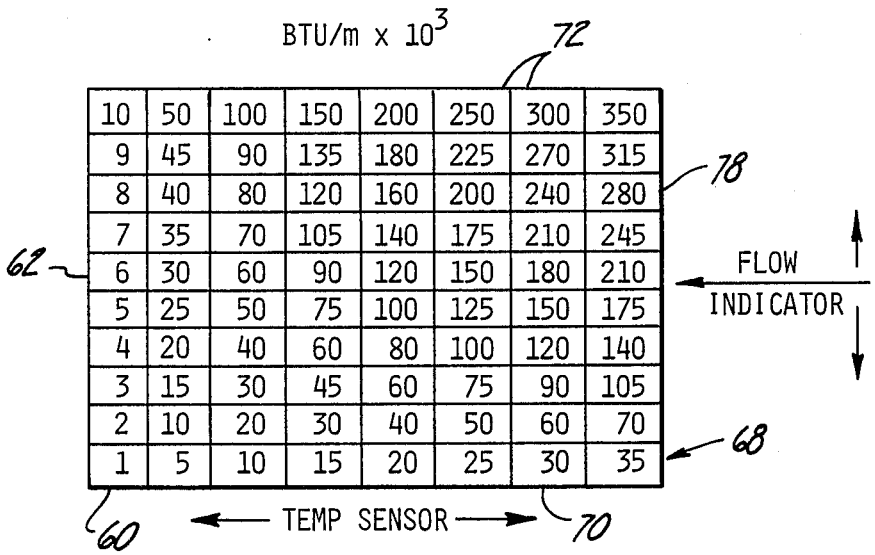
FIG. 8 is an enlarged front view of a portion of the flow meter shown in FIG. 7.

An especially advantageous use of a flow meter constructed in accordance with the present invention and some preferred modifications thereof are shown in FIGS. 7 and 8. FIG. 7 shows a portion of a fluid system in which a flow meter 10 is secured on the upstream side of a system portion 13 as well as a downstream side of the system portion 13. In addition, chart means 56 has been replaced with a chart means 68 providing a graphic representation of heat flow rates for the particular fluid in the system as affected by flow rate of the system and the temperature of the fluid in the system.

As best shown in FIG. 8, chart means 68 comprises a panel having graphic indicia 78 in the form of sets of numerical indicia exhibiting discrete values at numerous positions throughout the panel. Another novel feature of the panel of chart means 68 is that it incorporates sections of temperature sensitive material so that an entire section will graphically display a color change in response to the change in the temperature of the fluid. Thus, an entire column 72 is colored in response to temperature so that the coloration projects upwardly to intersect with the indicator edge 19 to permit observation of the heat flow rate at the particular point in the system. Accordingly in the system connected as shown in FIG. 7, a change in heat flow rate occuring through the system portion 13 can be readily detected by observing the difference in readings exhibited by the meters 10 connected on opposite sides of the system section 13.

Having thus described my invention, many modifications thereto will become apparent to those skilled in the art to which it pertains without departing from the scope and spirit of the present invention as defined in the appended claims.

What is claimed is:

1. A fluid flow meter comprising:

a housing comprising a peripheral wall defining an elongated hollow chamber therein and having a fluid inlet at a first end of said chamber and fluid outlet at a second end of said chamber; said peripheral wall including at least a wall portion thereof formed of a visually transparent material;

a chamber wall located in said housing and formed across one of said ends of said chamber, said chamber wall including at least one aperture therethrough;

a support body located in said housing and retained adjacent the other of said ends of said chamber, said support body including at least one aperture therethrough;

a rod extending between and mounted to each of said chamber wall and said support body;

a piston including a piston portion defining a linear peripheral demarcation aligned in profile perpendicularly to a longitudinal axis of said chamber; said piston also including a bore slidably receiving said rod therein, such that said piston is displaceably carried by said rod in a position so that said demarcation is visible through said transparent portion of said peripheral wall, and said piston portion circumferentially abuts against said peripheral wall, at said first end of said chamber; and means for resiliently biasing said piston towards said first end of said chamber;

wherein said peripheral housing wall includes a first inner surface tapering radially outwardly from said first chamber end, and a second inner surface adjacent said support body and between said support body and said chamber wall which is radially outwardly recessed from said first inner surface so as to form a bypass about said piston when the rate of flow exceeds a predetermined rate; and wherein said peripheral housing wall is imperforate between said chamber wall and said support body, such that said chamber is circumferentially imperforate between said chamber wall and said support body.

2. The invention as defined in claim 1 and further comprising scale indicia aligned along the longitudinal axis of said housing and visible exteriorly of said housing.

3. The invention as defined in claim 2 and further comprising a temperature sensitive overlay aligned with said scale indicia.

4. The invention as defined in claim 1 wherein said linear, peripheral demarcation comprises a radially expanded edge of said piston.

5. The invention as defined in claim 4 wherein said at least one peripheral portion of said piston comprises said radially expanded edge.

6. The invention as defined in claim 5 wherein said indicia includes a base line aligned at the point at which said edge abuts said peripheral wall.

7. The invention as defined in claim 6 and further comprising a temperature sensitive label secured to said housing at said base line.

8. The invention as defined in claim 1 wherein said housing includes scale indicia along said transparent peripheral wall portion.

9. The invention as defined in claim 1 wherein said housing comprises a tubular body, a first end cap at said first end of said chamber, a second end cap at said other end of said chamber and means for securing each of said end caps within said tubular body.

10. The invention as defined in claim 9 wherein said body is transparent.

11. The invention as defined in claim 9 wherein each end cap includes fluid passage means for communicating between said chamber and the exterior of said housing.

12. The invention as defined in claim 11 and further comprising means for sealing each of said first and second end caps to said housing.

13. The invention as defined in claim 1 wherein said piston includes a substantially cylindrical stub end, wherein said means for resiliently biasing comprises a coil spring, and wherein said coil spring fits over said stub end of said piston.

14. The invention as defined in claim 13 wherein the axial end of said stub end is tapered.

15. The invention as defined in claim 13 wherein the axial end of said stub end is tapered.

16. The invention as defined in claim 1 wherein said support body includes a substantially cylindrical stub end, wherein said means for resiliently biasing comprises a coil spring, and wherein said coil spring fits over said stub end.

17. The invention as defined in claim 1, adapted to indicate the value of a diverse nontemperature characteristic of a fluid flowing therethrough, said diverse characteristic being different from the rate of flow indicated by said linear portion; wherein said meter further comprises:
  a material responsive to the temperature of said fluid in thermal contact with said fluid so as to provide a visible indication correponding to the temperature of said fluid, disposed adjacent said linear piston demarcation; and
  a graphic indicium of said diverse nontemperature fluid characteristic disposed adjacent both of said linear piston demarcation and said temperature responsive material, said graphic indicium including a plurality of value indicia each designating a particular value of said diverse fluid characteristic as a function of both the value of fluid flow and the visible indication of fluid temperature provided by said temperature responsive material;
  such that said linear piston demarcation and said temperature responsive material together visibly designate a particular one of said values of said diverse fluid characteristic which can be directly visually perceived from said graphic indicium.

* * * * *